US006982743B2

(12) United States Patent
Danilidis et al.

(10) Patent No.: US 6,982,743 B2
(45) Date of Patent: Jan. 3, 2006

(54) MULTISPECTRAL OMNIDIRECTIONAL OPTICAL SENSOR AND METHODS THEREFOR

(75) Inventors: Kostas Danilidis, Philadelphia, PA (US); Elli Angelopoulou, Princeton, NJ (US); Vijay Kumar, Wilmington, DE (US)

(73) Assignee: Trustees of the University of Pennsylvania, Philadelphia, PA (US)

( * ) Notice: Subject to any disclaimer, the term of this patent is extended or adjusted under 35 U.S.C. 154(b) by 231 days.

(21) Appl. No.: 10/356,189

(22) Filed: Jan. 31, 2003

(65) Prior Publication Data

US 2004/0021766 A1    Feb. 5, 2004

Related U.S. Application Data

(60) Provisional application No. 60/353,677, filed on Jan. 31, 2002.

(51) Int. Cl.
*H04N 7/18* (2006.01)

(52) U.S. Cl. ..................................... 348/162; 348/167

(58) Field of Classification Search ......... 348/160–180
See application file for complete search history.

(56) References Cited

U.S. PATENT DOCUMENTS

| | | | |
|---|---|---|---|
| 3,505,465 A | | 4/1970 | Rees |
| 4,795,253 A | * | 1/1989 | Sandridge et al. ............ 356/51 |
| 5,920,376 A | | 7/1999 | Bruckstein et al. |
| 6,140,653 A | * | 10/2000 | Che ........................ 250/458.1 |

OTHER PUBLICATIONS

Basedow, R.W., Carmer, D.C., and Anderson, M.E., "HYDICE System, Implementation and Performance," *SPIE* 2480:258-267 (1995).
Benosman, R., and Kang, S.B., "Panoramic vision—sensors, theory and applications," Springer Verlag, 1st edition (2001).
Boult, T.E., "Remote reality demonstration," *IEEE Conf. Computer Vision and Pattern Recognition* 966, Santa Barbara, CA Jun. 23-25 (1998).
Szeliski, R., "Video mosaics for virtual environments," *Computer Graphics and Applications* 16(3): 23-30 (1996).
Vane, G., Green, R.O., Chrien, G., Enmark, H.T., Hanson, E.G. and Porter, W.M., "The airborne visible/infrared imaging spectrometer (AVIRIS)," *Remote Sensing of the Environment* 44: Issues 2-3: 127-143 (1993). Abstract only.
Wheeler, M.D., "Changing the face of warfare: countering a terrorist threat," Photonics Spectra 33(4): 124 (1999). Abstract only.

* cited by examiner

*Primary Examiner*—Andy Rao
(74) *Attorney, Agent, or Firm*—Evelyn H. McConathy; DrinkerBiddle&ReathLLP

(57) ABSTRACT

Provided is a multispectral and omnidirectional imaging sensor and system that produces improved surround awareness, as well as methods of use therefor. The multispectral omnidirectional optical sensor device comprises a series of view and reflecting mirrors for splitting the electromagnetic spectrum into two or more electromagnetic wavelength bands; in combination with a plurality of cameras that are spaced relative to the reflecting mirrors. Each camera senses one of the wavelength bands or the resulting signal passing through the mirrors and creates an image thereof (focussed on the same view), so that each image is automatically registered.

20 Claims, 3 Drawing Sheets

MULTISPECTRAL OMNIDIRECTIONAL OPTICAL SENSOR AND METHODS THEREFOR

REFERENCE TO RELATED APPLICATIONS

This application claims priority to U.S. Provisional Application No. 60/353,677 filed Jan. 31, 2002, the content of which is herein incorporated by reference.

FIELD OF THE INVENTION

The present invention relates to a multispectral and omnidirectional imaging sensor that provides improved surround awareness.

BACKGROUND OF INVENTION

Many security activities and military operations take place in complex environmental conditions. The operations and activities include, for example, surveillance, robotic navigation in uneven terrain, rescue missions in uneven terrain or debris, identification of live or dead bodies, and intruder detection in critical areas. The environmental conditions include a variety of weather conditions, such as rain and fog, smoke and different light conditions based on the time of day. To efficiently and effectively perform these activities in the variety of environmental conditions, it is necessary to have a sophisticated level of situational awareness. To achieve the desired level of awareness of the surroundings while providing an acceptable level of visualization, a system is needed that is multispectral and omnidirectional.

Multispectral imaging involves a collection of two or more monochrome images of the same scene, each taken with a different sensor, wherein each sensor captures a different wavelength band of the electromagnetic spectrum. Each sensor creates an image in each separate wavelength band or spectra. The images in each spectra are then combined to construct a multispectral image. Since the multispectral image includes images created from spectra other than visible light, the multispectral image provides a clearer and higher resolution image to an operator.

The concept of multispectral image analysis has been used since the 1960s, specifically in satellite imaging applications. For example, the Landsat series of Earth satellites capture four images at different spectral bands. More recent sensors, know as hyperspectral sensors, provide hundreds of spectral samples in the mid to far infrared wavelength range. For example, two well-known hyperspectral sensors, the Hyperspectral Digital Imagery Collection Experiment (HYDICE) sensor (Basedow et al. (1995) *Proceedings of SPIE* 2480:258–267), and the Airborne Visible/Infrared Imaging Spectrometer (AVIRIS) (e.g., see Vane et al. (1993) *Remote Sensing of the Environment* 44:127–143; Wheeler et al. (1999) *Photonics Spectra* 33(4): 124), each provide over two hundred spectral samples at each image location.

The multispectral sensing of high altitude images allows the analysis of aerial images with a high degree of precision. For example, using multispectral imaging analysis, aerial images include such detailed visualization as material classification, rock/soil analysis, plant monitoring, and airborne mine detection. However, although additional spectral information has been used to improve image analysis in aerial imaging, multispectral imaging, using more than two spectra, has not been used in analyzing non-aerial images.

Along with the resolution required for effective visualization and effective awareness of the surroundings, a system is required for viewing a wide field of view. Traditionally wide-angle lenses are used to capture a large field of view, (see, e.g., relevant pages in *Panoramic Vision* (Benosman et al., Ed.), Springer Verlag, $1^{st}$ edition (2001); *Proceedings of IEEE Workshop on Omnidirectional Vision*, Daniilidis (program chair); sponsored by IEEE Computer Society (Hilton Head Island, S.C., Jun. 12, 2000)). However, such lenses, also called fish-eye lenses, are complex combinations of individual lens elements and these lenses introduce radial distortions that are hard to model. Consequently, rotating cameras are currently used to provide visualization for a wide field of view. A special transformation, independent of the scene, is used for mapping images from a purely rotating camera. This transformation enables the mosaicking of the images into a panoramic image. Several mosaicking systems exist based on purely rotating cameras (see e.g., Szeliski (1996) *Computer Graphics and Applications*, 16(3): 23–30).

However, even though the mosaicking systems create high quality panoramic images, the systems are more suitable for photographic purposes. These existing mosaicking systems using rotating cameras to provide panoramic images have three main weaknesses: (a) simultaneous, multi-directional image acquisition is impossible; (b) they can only be successful with stationary scenes; and (c) they need additional power for the motors moving the cameras. Consequently, these systems are not suitable for the dynamic applications, such as navigation, and the continuous alertness required for surveillance.

Omnidirectional systems comprise devices for visualization of hemispherical fields of view. Omnidirectional imaging is based on combinations of mirrors and lenses, such as those used in telescope construction. Initially, the omnidirectional systems used a panoramic field of view camera (U.S. Pat. No. 3,505,465 (Rees)). Subsequently a pyramidal conical mirror-lens system was introduced (Nalwa, (1996) Technical report, Bell Labs, Holmdel, N.J.). Finally, the use of a Head Mounted Display (HMD) was developed (Boult, *IEEE Conf. Computer Vision and Pattern Recognition*, pp. 966–967, Santa Barbara, Calif., Jun. 23–25, 1998). When using an HMD, a tracker provides the orientation of the observer's head and maps the section of the panoramic image to the position of the observer's head, so that the image matches the position of the observer's head. In this way, the operator using a HMD continues to accurately view the scene as the operator's head is rotated. However, these trackers can be used by an operator only in a closely controlled environment.

Accordingly, the current systems have failed to provide adequate sensing systems for operations that may be used at any time of day in smoky, rainy, and foggy conditions. Thus, a need has remained for a means for effective and efficient visualization and surround awareness necessary for security and robotics applications through combining multispectral imaging for improved visualization and an omnidirectional system for viewing a wider field of view.

SUMMARY OF THE INVENTION

The present invention provides a multispectral and omnidirectional imaging sensor that provides improved surround awareness. The multispectral omnidirectional optical sensor device comprises: (i) an axisymmetric mirror providing a hemispherical field of view; (ii) one or more reflecting mirrors for splitting the electromagnetic spectrum into two or more electromagnetic wavelength bands; and (iii) a plurality of cameras spaced relative to the reflecting mirrors, wherein the number of cameras in the plurality is at least one greater than the number of reflecting mirrors, and wherein each camera senses one of the two or more wavelength bands and creates an image thereof so that each of the images is automatically registered. Also provided are embodiments wherein the axisymmetric mirror is a parabolic mirror, and wherein electromagnetic spectrum is split into at least three electromagnetic spectra, such as visible, near-infrared, and far-infrared spectra. Further provided is a formula used to calculate the relative spacing of the plurality of cameras and the one or more reflecting mirrors.

Also provided is a method for multispectral omnidirectional imaging comprising: (i) providing a hemispherical field of view by an axisymmetric mirror; (ii) splitting the electromagnetic spectrum into two or more electromagnetic wavelength bands with one or more reflecting mirrors; (iii) positioning a plurality of cameras relative to the reflecting mirrors, wherein the number of cameras in the plurality is at least one greater than the number of reflecting mirrors, and wherein each camera senses one of the two or more wavelength bands and creates an image thereof; and (iv) automatically registering each image from each camera to create a multispectral image.

Additionally provided is a system for multispectral omnidirectional imaging comprising: (i) a means for providing a hemispherical field of view; (ii) a means for splitting the electromagnetic spectrum into two or more electromagnetic wavelength bands; (iii) a means for sensing each of the two or more wavelength bands and creating an image thereof; and (iv) a means of automatically registering each image.

Additional objects, advantages and novel features of the invention will be set forth in part in the description and figures which follow, and in part will become apparent to those skilled in the art on examination of the following, or may be learned by practice of the invention.

BRIEF DESCRIPTION OF DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown.

DESCRIPTION OF THE PREFERRED EMBODIMENTS

Figure 1:
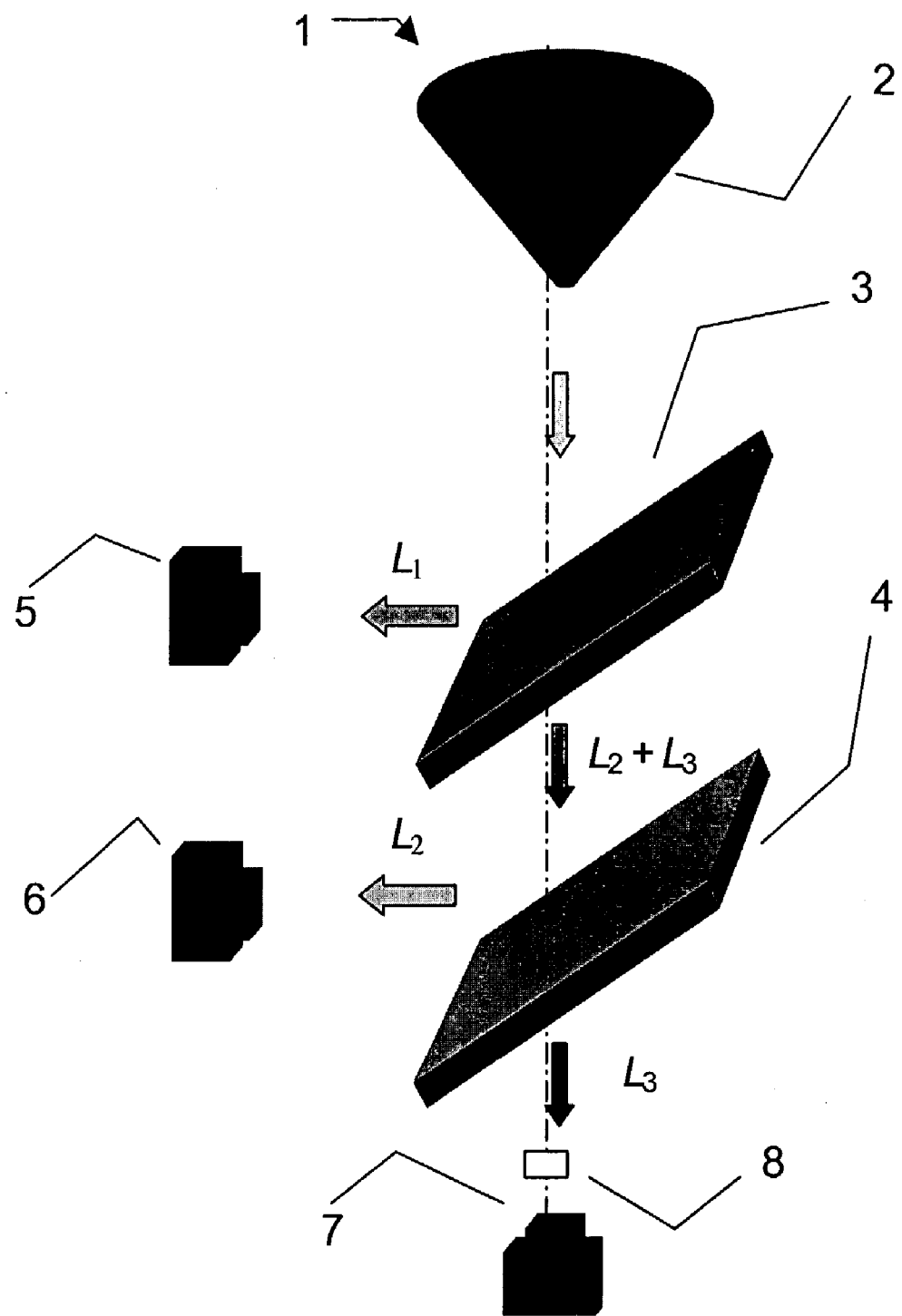
FIG. 1 shows an exploded representation of the sensor.

The description contained herein relates to a multispectral and omnidirectional imaging sensor that provides improved surround awareness. This description, however, is intended to be illustrative only and not limiting as to the scope of the present invention. Referring now to the drawings, the details of embodiments of the invention are graphically and schematically illustrated. Like elements in the drawings are represented by like numbers.

The multispectral omnidirectional imaging sensor 1 comprises a plurality of mirrors and a plurality of cameras that separate the electromagnetic waves into separate spectra or wavelength bands and create images for each spectra. The components of sensor 1 are positioned so that the images from each camera automatically register to create a multispectral image combining all the imaged spectra. Using pseudo-coloring the separate images of each spectra are combined into a multispectral image.

The term "omnidirectional" is used herein to mean involving all directions. Specifically, the term refers to a device having a hemispherical field of view. The term "multispectral" is used herein to mean at least two or more bands (spectra) or ranges of wavelengths of electromagnetic waves. In the electromagnetic spectrum, each band or spectra is defined by the wavelength of its electromagnetic wave. Table 1 delineates known types of electromagnetic waves and associated wavelength bands. A "multispectral image" is a collection of several monochrome images of the same scene, wherein each image is captured with a different sensor. Each sensor is sensitive to a different band of wavelengths and creates an image of a specific spectrum. The images of each spectrum are then combined to create the multispectral image.

TABLE 1

| Electromagnetic Waves | Range of Wavelengths |
| --- | --- |
| Gamma rays | <1 pm (1 × $10^{-12}$ m) |
| X-rays | 1 pm (1 × $10^{-12}$ m) to 1 nm (1 × $10^{-9}$ m) |
| Ultraviolet light | 1 nm (1 × $10^{-9}$ m) to 400 nm (400 × $10^{-9}$ m) |
| Visible Light | 400 nm (400 × $10^{-9}$ m) to 700 nm (700 × $10^{-9}$ m) |
| Near Infrared light | 700 nm (700 × $10^{-9}$ m) to 2 $\mu$m (2 × $10^{-6}$ m) |
| Infrared light | 2 $\mu$m (2 × $10^{-6}$ m) to 1 mm (1 × $10^{-3}$ m) |
| Microwave | 1 mm (1 × $10^{-3}$ m) to 10 cm (1 × $10^{-1}$ m) |
| Weather Radar | Around 10 cm |
| FM Radio | 2.8 m to 3.4 m |
| Short Wave | 10 m to 100 m |
| AM Radio | 200 m to 500 m |

FIG. 1 is an exploded view showing the components of a preferred embodiment of sensor 1. Sensor 1 comprises an axisymmetric mirror 2, a first reflecting mirror 3 and second reflecting mirror 4, and first, second and third cameras 5, 6, and 7. The function of sensor 1 is achieved through the selection of specific components and by the configuration of those components, i.e., the location of the components in relation to each other. The selection and location of the components are based on specific geometric principles.

The basic geometric principles of sensor 1 are based on reflecting light with a combination of mirrors and lenses, such as are used in reflecting telescopes. A reflecting telescope comprises a concave primary mirror and a flat reflecting mirror reflecting the image through a lens. In a reflecting telescope, the light is twice redirected until it reaches the lens of the viewer. This design allows astronomers to observe a very narrow field of view. In contrast to the reflecting telescope, sensor 1 is designed for a wide field of view. In a preferred embodiment of sensor 1, the concave mirror of the reflecting telescope is replaced by a generally convex, axisymmetrical mirror 2. These mirror-lens combinations are referred to as catadioptric systems. Catadioptric sensors use a combination of lenses and mirrors placed in a carefully arranged configuration to capture a wide field of view, and to form a projection onto the image plane of a camera. The effects of the catadioptric system depend on the profile or shape of the mirror and the optics of the lens.

Figure 2:
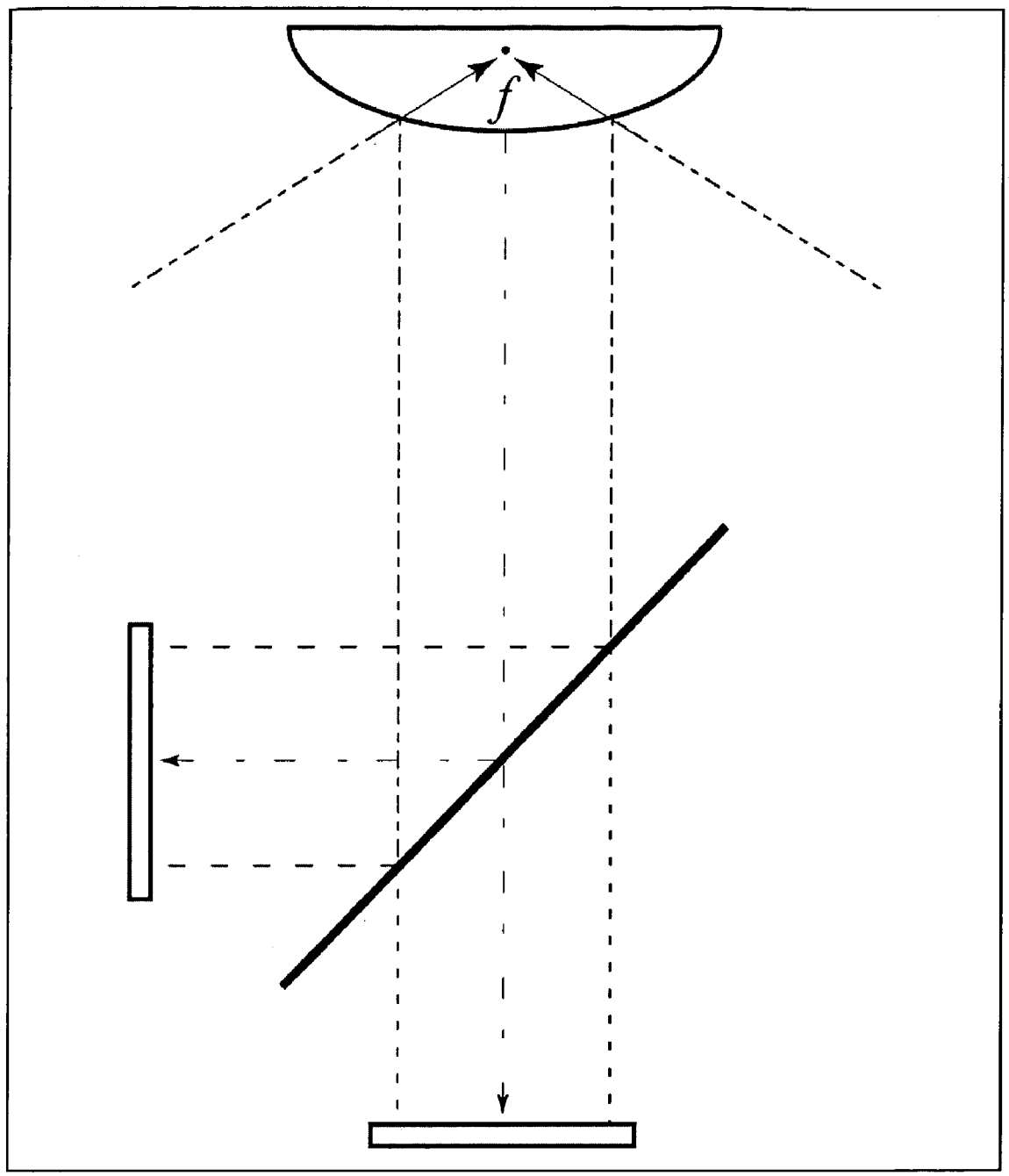
FIG. 2 shows an optical fractionating column.

In a preferred embodiment of sensor 1, conic mirrors are combined with semi transparent planar mirrors to form an optical fractionating column. In such an optical fractionating column, as shown in FIG. 2, the planar mirrors separate or split out the different wavelength bands in the transmitted electomagnetic signal. Thus, each planar mirror, located in a configuration such as shown in FIG. 2, separates a different wavelength band or spectra. In the multi-mirror design embodied in sensor 1, the combination of planar mirrors 3 and 4 and parabolic mirror 2 preserve the geometric properties for proper reflection of the light.

As shown in FIG. 1, axisymmetric mirror 2 provides a hemispherical field of view that allows sensor 1 to read omnidirectional signals. The first and second reflecting mirrors 3 and 4 split the electromagnetic spectrum into separate electromagnetic wavelength bands. Each reflecting mirror 3 or 4 reflects one specific band and permits the other wavelengths to pass through the mirror. Hence, the number of electromagnetic bands chosen for imaging governs the number of reflecting mirrors needed. First, second and third cameras 5, 6 and 7 receive the electromagnetic waves and create images for each wavelength band. The optical axis, or line of sight, runs through the center of mirror 2 to the focal point of camera 7. In alternate embodiments of sensor 1, the number of reflecting mirrors need not be limited to two as indicted by reflecting mirrors 3 and 4 of the preferred embodiment, but may be more depending on the number of spectra to be imaged. Likewise, the number of cameras need not be limited to three as shown in the preferred embodiment, but may be more corresponding to the number of reflecting mirrors used.

The specific configuration of the combined components is based on the size and shape of mirror 2 and the Field of View (FOV) of each camera. In the preferred embodiment, each camera has the same field of view. This ensures that all spectra are registered, having the same point located at the same pixel. In a preferred embodiment, mirror 2 is generally parabolic in shape with profile p, having planar side 20 perpendicular to the optical axis of sensor 1. The focal length, f, of mirror 2 is the distance from planar side 20 to the center of profile of mirror 2. Mirror 2 has diameter d, meaning, the diameter of the mirror at the planar side 20. Each camera has a field of view, FOV. The distance along the optical axis from the center of planar side 20 of mirror 2 to the center of reflecting mirror 3 or 4 is $h_1$, and the distance along an axis perpendicular to the optical axis from the center of each reflecting mirror 3 or 4 to cameras 5 and 6, respectively, is $h_2$.

The following formula has been developed to calculate the relative spacing of the plurality of cameras and the one or more reflecting mirrors.

$$\tan(FOV/2) = (d/2)/(h_1 + h_2) \quad \text{(Equation 1)}$$

In a preferred embodiment, sensor 1 detects at least three wavelength bands. In particular, the detected bands are visible light, near infrared, and far-infrared wavelengths. However, as one skilled in the art would know, alternate embodiments would be used for other wavelength bands. Additionally, as one skilled in the art would know, alternate embodiments of mirror 2 may reflect additional wavelength bands, and additional reflecting mirrors may be used to provide images in additional electromagnetic bands. Accordingly, even though the preferred embodiment of sensor 1 as shown in FIG. 1 has two reflecting mirrors, any number of reflecting mirrors may be used based on the desired number of bands to be imaged.

Figure 3:
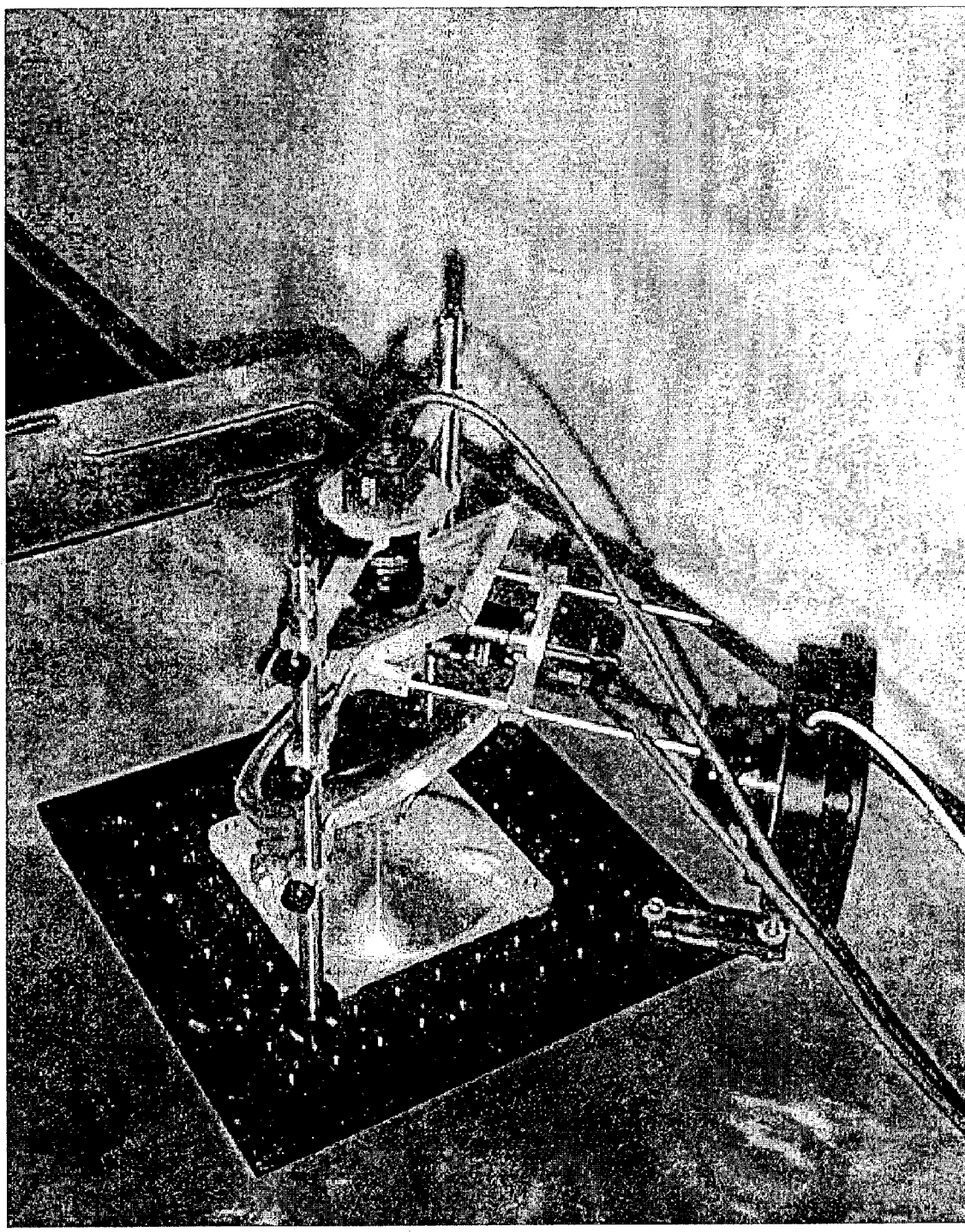
FIG. 3 shows a prototype of the sensor.

In a preferred embodiment, first reflecting mirror 3 is a hot mirror located adjacent to axisymmetric mirror 2. A "hot mirror," as the term is used herein, reflects incident infrared wavelengths at 45 degrees, but transmits visible light. First reflecting mirror 3 reflects the far-infrared wavelength band $L_1$ towards far-infrared camera 5. In the embodiment shown in FIG. 3, a circular mirror is used for reflecting mirror 3, however, as one skilled in the art would know, suitable alternative shapes may be used.

In the same embodiment, second reflecting mirror 4 is a cold mirror. A "cold mirror," as the term is used herein, reflects incident visible wavelengths at 45 degrees, but transmits infrared wavelengths through the mirror. Reflecting mirror 4 reflects the visible spectrum $L_2$ towards visible camera 6.

The diameters of reflecting mirrors 3 and 4 depend on the diameter of axisymmetrical mirror 2, so that all light from mirror 2 is captured by reflecting mirrors 3 and 4. In other words, reflecting mirrors 3 and 4 are sized so that all light from mirror 2 is either reflected or passes through reflecting mirrors 3 and 4. Accordingly, no light from mirror 2 passes outside the diameter or perimeter of reflecting mirrors 3 and 4.

Third camera 7 is located centered on the optical axis directly opposite mirror 2 to capture the specific wavelength $L_3$ that passes through both reflecting mirrors 3 and 4. In the embodiment shown, camera 7 images the near infrared band.

First, second and third cameras 5, 6 and 7 receive the omnidirectional electromagnetic waves and create images for each separate wavelength band. Thus, the number of cameras required for sensor 1 is one greater than the number of reflecting mirrors used, wherein the last camera receives the remaining signal that has passed through all of the reflecting mirrors. The locations of first, second and third cameras 5, 6 and 7, are at fixed positions, each at a specific distance from mirror 2, as defined by Equation 1. The fixed locations defined by Equation 1 allow the separate images to be automatically registered so that all three images appear at the same positions in all three image planes. Accordingly, all three spectra are registered, i.e., a particular scene point in the actual view appears at the same pixel in all three spectral images, regardless of the wavelength being transmitted.

In a preferred embodiment exemplified in FIG. 1, mirror 2 has an FOV of 35 degrees, a focal length, f of one and one half (1.5) inches and diameter, d, is six (6) inches. Hot mirror 3 is placed at a 45 degree angle from mirror 2, and located so that hot mirror $h_1$, (i.e., the distance from mirror 2 along the optical axis), is four (4) inches. In the exemplified device, hot mirror 3 is formed from Pyrex glass, however, one skilled in the art would know of suitable alternate materials. For example, hot mirror 3 may be made out of multi-layer dielectric coatings deposited either on polished Pyrex or thermal borosilicate glass.

In the exemplified device, far infrared camera 5 has a focal length of 18 mm and is located so that far infrared $h_2$, (i.e., the distance from hot mirror 3 to the view point of far infrared camera 5 perpendicular to the optical axis), is five and one half (5.5) inches. In the exemplified device, camera 5 is an S-300 (Raytheon, Lexington, Mass.) However, one skilled in the art would be aware of alternate cameras which may be used for far infrared camera 5.

In the exemplified device, cold mirror 4 is placed at a 45 degree angle from mirror 2 and located so that cold mirror hi, (i.e., the distance from mirror 2 along the optical axis), is seven (7) inches. For example, cold mirror 4 is preferably made from a borofloat substrate, however, one skilled in the art would know of suitable alternate materials. Cold mirror 4 may also be made out of multi-layer dielectric coatings deposited either on polished Pyrex or thermal borosilicate glass (e.g., part number E43-962, Edmond Scientific, Barrington, N.J.). However, one skilled in the art would know of alternate suitable mirrors.

As used in the exemplified device, visible spectrum camera 6 has a focal length of 8 mm, and is located so that visible $h_2$, (i.e., the distance from cold mirror 4 to the view point of visible camera 6 perpendicular to the optical axis), is three (3) inches. In the preferred embodiment, camera 6 is a XC-77 (Sony Business Solutions & Systems Co., Park Ridge, N.J.). However, one skilled in the art would be aware of suitable alternate cameras which may be used for visible camera 6.

In the exemplified device, near infrared camera 7 has a focal length of 8 mm, and is located so that near infrared $h_1$, (i.e., the distance from mirror 2 along the optical axis to the focal point of camera 7), is ten (10) inches. In the exemplified device, camera 7 is an XC-77 camera adapted to capture the near infrared wavelengths. The built-in near infrared block filter of the XC-77 is removed, and an infrared-bandpass filter 8, such as RT-830, is placed directly in front of camera 7. However, alternate cameras that are designed to capture near infrared wavelengths may be used for camera 7. Additionally, one skilled in the art would know of alternate cameras that would be suitable to capture the near infrared wavelengths.

Since mirror 2 is omnidirectional, the material used for mirror 2 must reflect light with multiple angles of incidences and reflect a wide range of wavelength. Both silver and aluminum reflect more than 94% of the energy for a range from 0 degrees (front to parallel) to 60 degrees (the incident angle at the periphery of the parabolic). Additionally, for example, aluminum exhibits high reflectance over the widest range of wavelengths, from approximately 200 nm to far-infrared wavelengths. The preferred materials for detecting the widest range of electromagnetic radiation are aluminum, silver or gold. In a preferred embodiment, mirror 2 is formed from aluminum, however, one skilled in the art would be aware of alternative materials that could be used.

In the preferred embodiment, cameras 5, 6 and 7 are Charge Coupled Device (CCD) cameras. Each camera has a photosensitive chip made out of a semiconductor. When light (i.e., photons) falls on that chip, the semiconductor material reacts to the incident light (electrons are released). The reaction of the semiconductor to the incoming light is then recorded. CCD cameras are made a form of silicon. Silicon is reactive over a wide spectrum of wavelengths. It can record electromagnetic radiation ranging from soft x-ray, extreme ultraviolet, ultraviolet, visible and very near-infrared wavelengths.

In actual use of the above-described exemplified multispectral omnidirectional imaging device and system, the method comprises at least the following steps: (i) providing a hemispherical field of view by the axisymmetric mirror, (ii) splitting the electromagnetic spectrum into two or more electromagnetic wavelength bands with one or more reflecting mirrors, (iii) capturing the wavelength bands with a plurality of cameras that have been positioned relative to the reflecting mirrors, wherein there is always one more camera than the number of reflecting mirrors, and wherein each camera senses a unique wavelength band (either from a reflecting mirror or from the resulting signal that has passed through all of the reflecting mirrors), and creates an image thereof; then (iv) automatically registering each image from each camera to create a multispectral image.

Due to the fixed position of each component in the device, which is located in accordance with Equation 1, each image generated by each camera is automatically registered. In this way, the operator is provided with the optimal visualization of the scene. For example, at dawn or dusk, differences in thermal signals are less clear. At these times, near infrared images provide additional clarity. Because sensor 1 automatically registers all three spectra, the operator is automatically provided with the best view of the scene. Additionally, because all three spectra are automatically registered, no action is required by the operator to create the most effective visualization.

The disclosures of each patent, patent application and publication cited or described in this document are hereby incorporated herein by reference, in their entirety.

While the foregoing specification has been described with regard to certain preferred embodiments, and many details have been set forth for the purpose of illustration, it will be apparent to those skilled in the art without departing from the spirit and scope of the invention, that the invention may be subject to various modifications and additional embodiments, and that certain of the details described herein can be varied considerably without departing from the basic principles of the invention. Such modifications and additional embodiments are also intended to fall within the scope of the appended claims.

What is claimed is:

1. A multispectral omnidirectional optical sensor device comprising: an axisymmetric mirror providing a hemispherical field of view; one or more reflecting mirrors for splitting the electromagnetic spectrum into two or more electromagnetic wavelength bands; and a plurality of cameras spaced relative to the reflecting mirrors, wherein the number of cameras in the plurality is at least one greater than the number of reflecting mirrors, and wherein each camera senses one of the two or more wavelength bands and creates an image thereof so that each of the images is automatically registered.

2. The device of claim 1, wherein the axisymmetric mirror is a parabolic mirror.

3. The device of claim 1, wherein the one or more reflecting mirrors split the electromagnetic spectrum into at least three electromagnetic spectra.

4. The device of claim 1, wherein the one or more reflecting mirrors split the electromagnetic spectrum into visible, near-infrared, and far-infrared spectra.

5. The device of claim 3, wherein the one or more reflecting mirrors split the electromagnetic spectrum into visible, near-infrared, and far-infrared spectra.

6. The device of claim 1, further comprising a formula used to calculate the relative spacing of the plurality of cameras and the one or more reflecting mirrors.

7. A method for multispectral omnidirectional imaging comprising: providing a hemispherical field of view by an axisymmetric mirror; splitting the electromagnetic spectrum into two or more electromagnetic wavelength bands with one or more reflecting mirrors; positioning a plurality of cameras relative to the reflecting mirrors, wherein the number of cameras in the plurality is at least one greater than the number of reflecting mirrors, and wherein each camera senses one of the two or more wavelength bands and creates an image thereof; and automatically registering each image from each camera to create a multispectral image.

8. The method of claim 7, wherein the axisymmetric mirror is a parabolic mirror.

9. The method of claim 7, further comprising splitting the electromagnetic spectrum into at least three electromagnetic spectra by the one or more reflecting mirrors.

10. The method of claim 7, further comprising splitting the electromagnetic spectrum into visible, near-infrared, and far-infrared spectra.

11. The method of claim 9, further comprising splitting the electromagnetic spectrum into visible, near-infrared, and far-infrared spectra.

12. A system for multispectral omnidirectional imaging comprising: a means for providing a hemispherical field of view; a reflective means for splitting the electromagnetic spectrum into two or more electromagnetic wavelength bands; a photographic means for sensing each of the two or more wavelength bands and creating an image thereof, and automatically registering each image.

13. The system of claim 12, wherein the means for providing a hemispherical field of view comprises an axisymmetric mirror.

14. The system of claim 13, wherein the axisymmetric mirror is a parabolic mirror.

15. The system of claim 12, where the means for splitting the electromagnetic spectrum into two or more electromagnetic wavelengths comprises one or more reflecting mirrors.

16. The system of claim 15, wherein the one or more reflecting mirrors split the electromagnetic spectrum into at least three electromagnetic spectra.

17. The system of claim 15, wherein the electromagnetic spectrum is split into visible, near-infrared, and far-infrared spectra.

18. The system of claim 16, wherein the electromagnetic spectrum is split into visible, near-infrared, and far-infrared spectra.

19. The system of claim 15, wherein the means for sensing each of the two or more wavelength bands and creating an image thereof comprises a plurality of cameras spaced relative to the reflecting mirrors, wherein the number of cameras in the plurality is at least one greater than the number of reflecting mirrors, and wherein each camera senses one of the two or more wavelength bands, and wherein each image is automatically registered.

20. The system of claim 19, wherein a formula is used to calculate the relative spacing of the plurality of cameras and the one or more reflecting mirrors.

* * * * *

UNITED STATES PATENT AND TRADEMARK OFFICE
CERTIFICATE OF CORRECTION

PATENT NO. : 6,982,743 B2  Page 1 of 1
APPLICATION NO. : 10/356189
DATED : January 3, 2006
INVENTOR(S) : Kostas Daniilidis, Elli Angelopoulou and Vijay Kumar It is certified that error appears in the above-identified patent and that said Letters Patent is hereby corrected as shown below:

On the title page, item (75), Inventors, the name "Kostas Danilidis" appears; please correct this to read --Kostas Daniilidis--.

Signed and Sealed this

Second Day of June, 2009

JOHN DOLL
*Acting Director of the United States Patent and Trademark Office*